June 11, 1968     S. A. RICKERT     3,387,711
HORIZONTAL, MULTIPLE PLATE FILTER ASSEMBLY
Filed Sept. 13, 1967     3 Sheets-Sheet 2
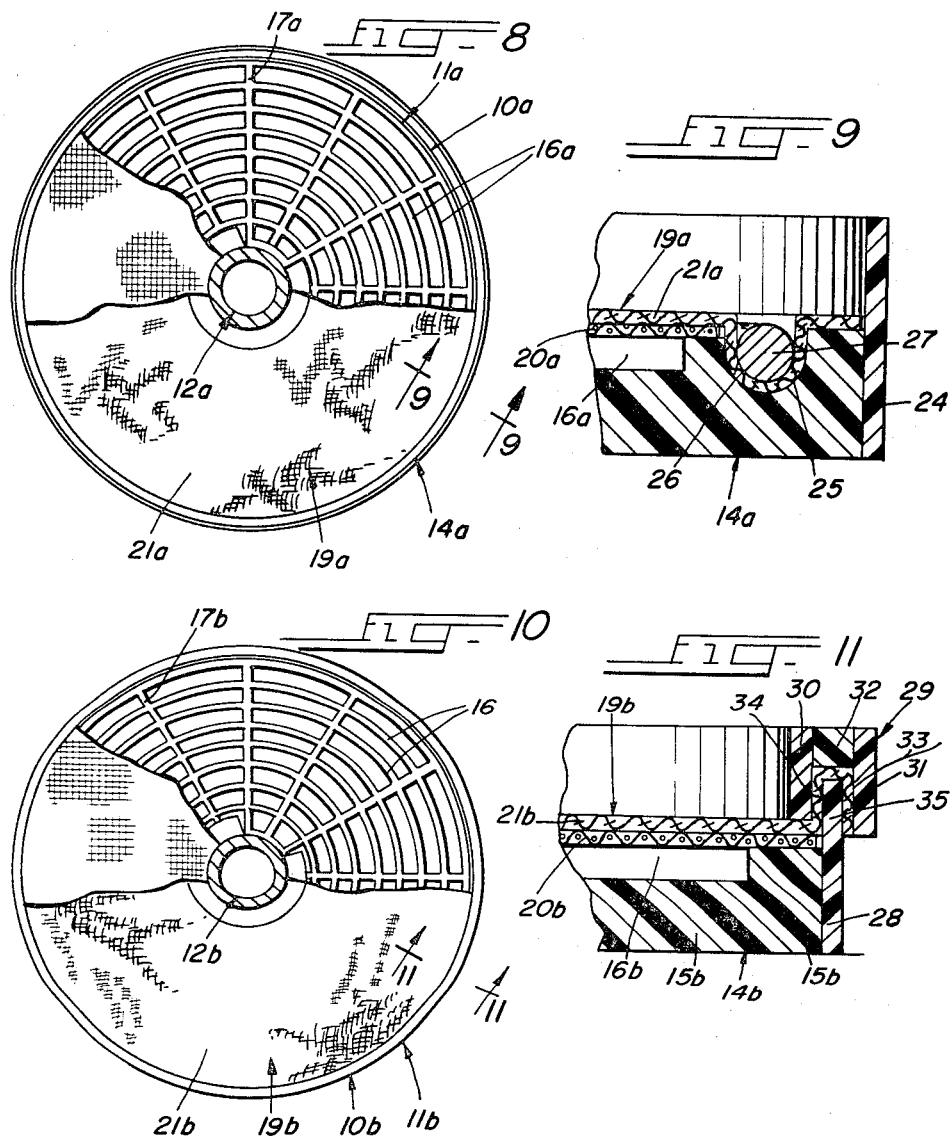
INVENTOR
SHERWOOD A. RICKERT
BY
Charles B. Cannow
His Atty June 11, 1968  S. A. RICKERT  3,387,711
HORIZONTAL, MULTIPLE PLATE FILTER ASSEMBLY
Filed Sept. 13, 1967  3 Sheets-Sheet 3
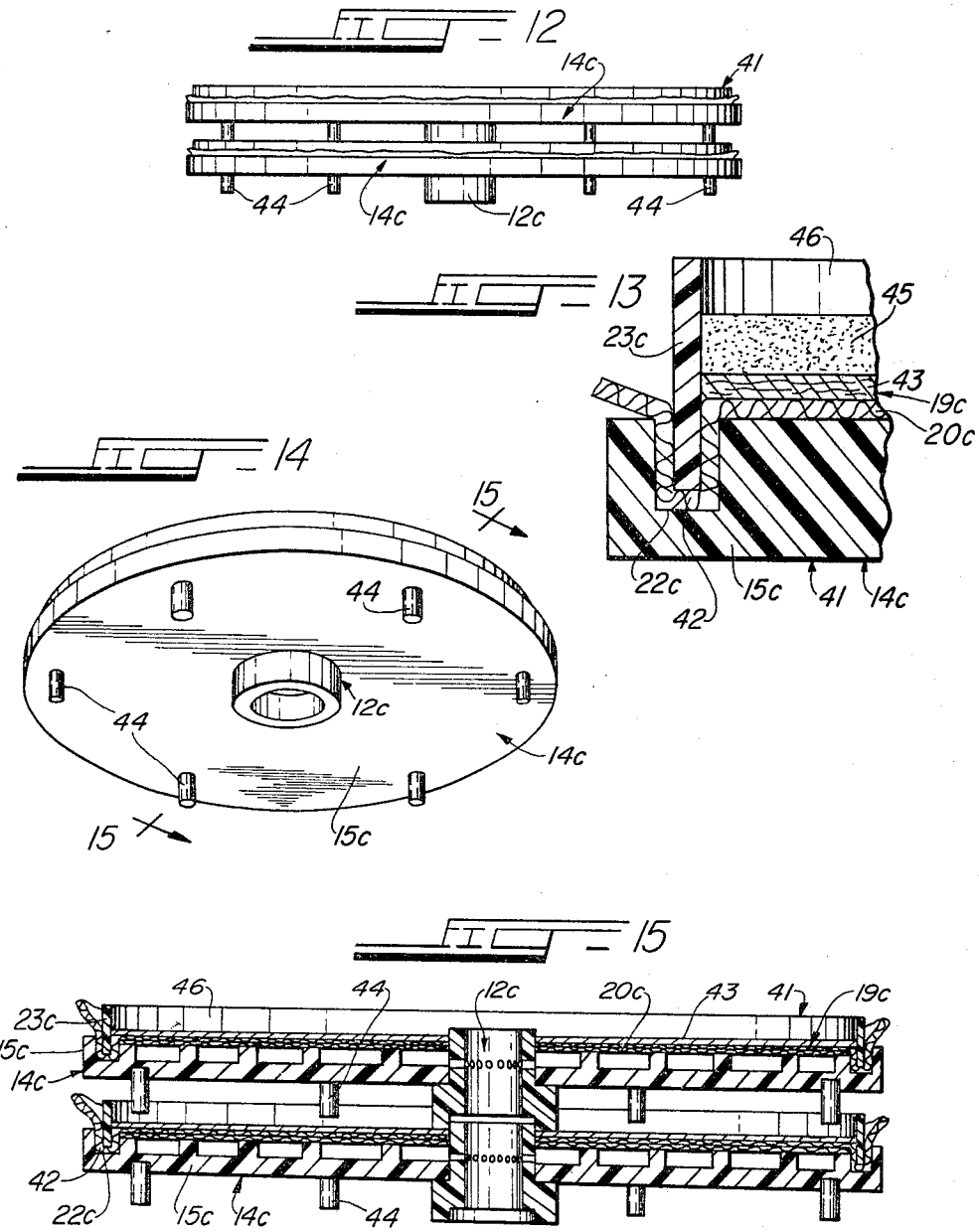
INVENTOR.
SHERWOOD A. RICKERT
BY Charles B. Cannon
His Atty.

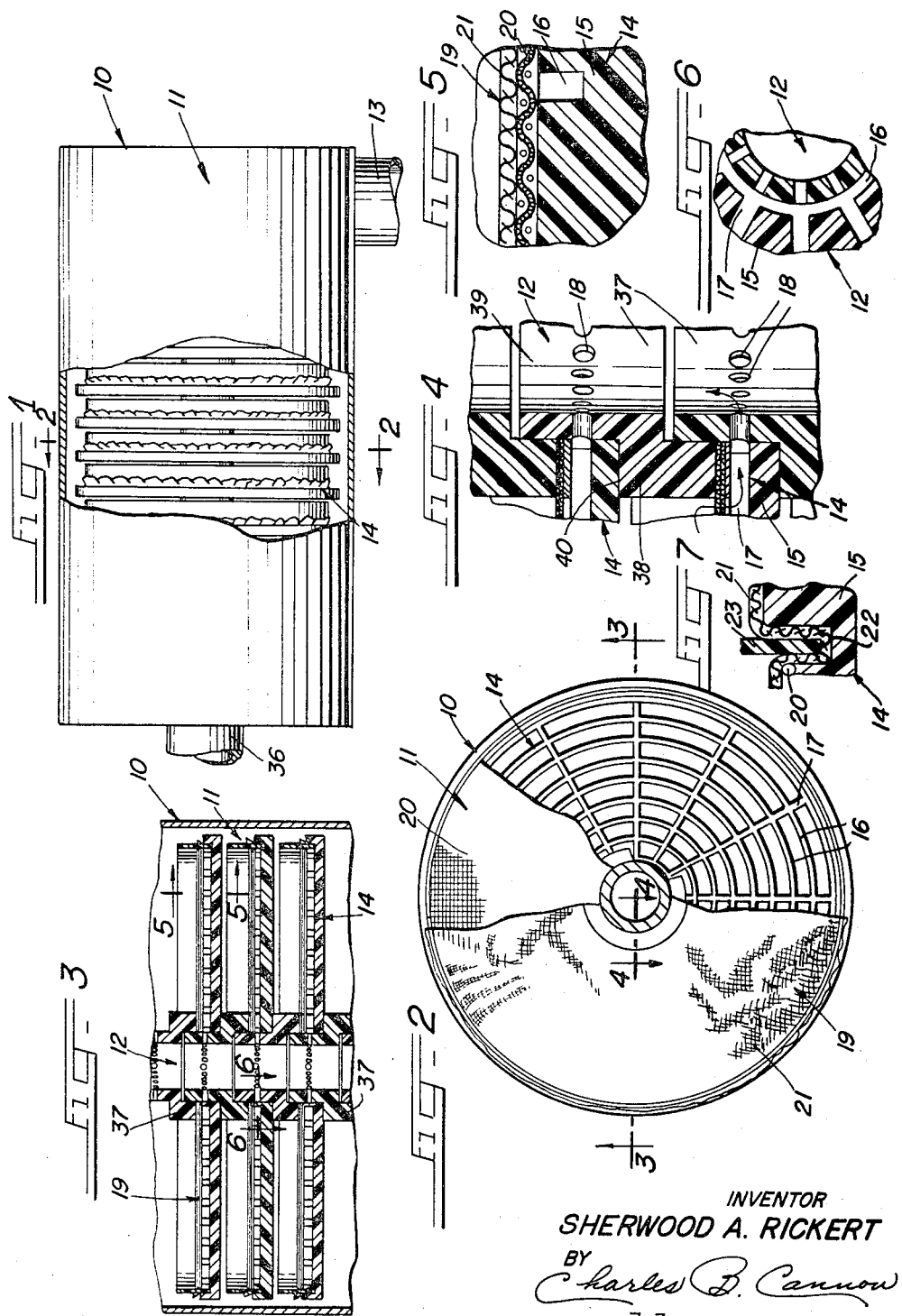

United States Patent Office 3,387,711
Patented June 11, 1968

3,387,711
HORIZONTAL, MULTIPLE PLATE
FILTER ASSEMBLY
Sherwood A. Rickert, 2559 N. Monitor Ave.,
Chicago, Ill. 60638
Continuation-in-part of application Ser. No. 474,702,
July 28, 1965. This application Sept. 13, 1967, Ser.
No. 667,509
4 Claims. (Cl. 210—344)

ABSTRACT OF THE DISCLOSURE

A filter assembly having stacked plates, each plate in one embodiment having a clamping ring attached to its outer periphery and projecting upwardly therefrom and having a U-shaped, annular clamping unit secured over the ring to secure a filter element therebetween; each plate in the other embodiment having an annular groove in one face thereof adjacent the outer periphery, the groove having an outer portion of a filter element secured therein by an annular cylindrical clamping member, the clamping member also holding filter aid material securely on the filter element.

---

This application is a continuation-in-part of applicant's U.S. application, Ser. No. 474,702 filed July 28, 1965, now abandoned, and entitled "Filter Apparatus."

This invention relates to a filter apparatus and, more particularly, to a filter apparatus which is adapted for use in filtering chemical electro-plating solutions and the like.

Discussion

One of the problems heretofore experienced in the use of such prior art filter apparatus has been the fact that the filter units embodied therein have been so integrated that in order to replace one individual filter unit it was necessary to disassemble the entire apparatus.

Objects

Accordingly, an object of the present invention is to provide a new and improved filter apparatus which is particularly adapted for use in filtering chemical electroplating solutions, and the like, and which embodies a plurality of filtering units which are separate and independent units assembled in such a manner that each unit may be replaced if and when necessary and a new filter unit inserted in place thereof without the necessity for disassembling the entire filter apparatus.

Another object of the present invention is to provide a new and improved filter apparatus embodying a flexible fabric filtering screen unit and novel means for removably fastening the filter screen unit on the body of the filter unit.

Another object of the invention is to provide in one form thereof a filter unit embodying novel clamping means for the filter screen unit including an annular clamping member which includes an upwardly extending wall portion which surrounds a paper or like disc component of the filter screen unit to prevent the filter powder or cake thereon from being washed off the upper surface of the said paper or like filter disc in use.

An additional object of the invention is to provide in one form thereof an annular row of depending projections or pegs on the bottom surface of the body of each filter unit and which depending projections or pegs extend downwardly toward but are spaced slightly above the upper surface of the paper disc or like filter element therebelow to prevent the solution which is being filtered from entering under the paper disc or like filtering element and raising the latter up out of its proper position of use.

Other objects will appear hereinafter.

Drawings

In the drawings:
FIG. 1 is an elevational view of a filter apparatus embodying the present invention with a part of the housing thereof broken away to show the assembled filter units arranged therein;

FIG. 2 is a transverse sectional view on line 2—2 in FIG. 1 with part of one of the filter screen units broken away to reveal the internal construction of the filter unit with which it is associated;

FIG. 3 is a central vertical sectional view on line 3—3 in FIG. 2;

FIG. 4 is an enlarged fragmentary vertical sectional view on line 4—4 in FIG. 2;

FIG. 5 is an enlarged fragmentary sectional detail view of one of the filter units embodied in the form of the invention shown in FIGS. 1 to 4, inclusive;

FIG. 6 is an enlarged sectional detail view on line 6—6 in FIG. 3;

FIG. 7 is an enlarged fragmentary sectional detail view of one of the new filter units showing the screen unit and the novel clamping means embodied in the present invention for holding the screen unit in position of use on the body of the filter unit;

FIG. 8 is a view similar to FIG. 2 but illustrating a modification of the invention;

FIG. 9 is an enlarged fragmentary sectional view on line 9—9 in FIG. 8;

FIG. 10 is a view similar to FIGS. 2 and 8 but illustrating another modification of the invention;

FIG. 11 is an enlarged sectional detail view on line 11—11 in FIG. 10;

FIG. 12 is a side elevational view of another modification of the invention;

FIG. 13 is an enlarged sectional detail view, similar to FIG. 7, of the form of the invention shown in FIG. 12;

FIG. 14 is a bottom perspective view of the form of the invention shown in FIGS. 12 and 13; and FIG. 15 is an enlarged sectional view on line 15—15 in FIG. 14.

Description

A preferred embodiment of the present invention is illustrated in FIGS. 1 to 7, inclusive, of the drawings, and comprises a filter apparatus, generally indicated at 10, and including a cylindrical housing 11 having a centrally arranged tubular passage 12 extending therethrough and having an inlet 36 and an outlet 13. The centrally arranged passage 12 is preferably formed of a plurality of plastic resinous cylindrical sections 37 which are fitted or nested one upon the other to form the cylindrical passage 12.

The new filtering apparatus 10 includes a plurality of filtering units 14 assembled or stacked in the housing 11, and each of these filtering units 14 includes a body 15 in which there are formed a series of concentrically arranged annular or circular passages 16 and radially extending passages 17 which are interconnected with the annular or circular passages 16. The annular passages 16 and the radially extending passages 17 in the body 15 of each filter unit 14 communicate with radially extending passages 18 in the body of the adjacent cylindrical section 37 which form the centrally arranged tubular passageway 12, as best shown in FIGS. 4 and 6 of the drawings. As best shown in FIG. 4 each of the cylindrical sections 37 includes a radially outer body portion 38 and a radially inner body portion 39, in which the radially extending passages 18 are formed, and an annular shoulder 40 is formed in each of the cylindrical sections 37 by a transverse web which interconnects the inner and outer portions 39 and 38, respectively, thereof, and the outer marginal edge portion of the body 15 of the corresponding filter unit 14 rests upon the annular shoulder 40 of the corresponding one of the cylindrical sections 36.

Each of the new filtering units 14 includes a screen unit 19 and each of the screen units 19 includes an inner fabric screen member 20, which is preferably formed of plastic resinous fabric material, and an outer cloth screen member 21.

The form of the invention illustrated in FIGS. 1 to 7, inclusive, embodies novel clamping means for holding each of the corresponding filter unit 14 and to this end an annular groove 22 is formed in the body 15 of the filter unit 14 and the outer marginal edge portion of the screen member 21 is extended down into the annular groove 22 and is retained therein by an annular clamping ring 23 which is frictionally or otherwise fitted into the annular groove 22 so as to retain a portion of the outer screen member 21 therein, as best shown in FIG. 7 of the drawings. Each of the clamping rings 23 is preferably formed of a suitable flexible plastic resinous material.

In the use of the form of the new filtering apparatus as shown in FIGS. 1 to 7, inclusive, the filtering apparatus 10 may be assembled with the other parts of chemical electro-plating equipment, with the filtering apparatus 10 disposed in a vertical position. The chemical electro-plating solution enters the central tubular passage 12, by way of the inlet 36, at the top of the filter housing 11, from which it will flow downwardly and radially outwardly through the radial passages 18 in one of the cylindrical sections 24, thence out into the annular passages 16 and into the radially extending passages 17 of the body 15 of the filter unit 14 and thence through the screen unit 19 and downwardly into the next adjacent filter unit 14 therebelow from which the solution will flow back through the annular and radially extending passages 16 and 17, respectively, into the central passage 12, this movement of the solution being repeated until finally the filtered solution passes out of the outlet 13 and then returned by way of the other parts of the electro-plating equipment to the central passage 12 of the filter housing 11.

In this manner the chemical electro-plating solution is filtered and cleaned as it passes through the filter apparatus 10.

If and when it is necessary to replace or repair one of the screen units 19, in the form of the invention illustrated in FIGS. 1 to 7, inclusive, this may readily be accomplished by opening the housing 11 and sliding a bank of the filter units 19 along the central tubular passage 12 to gain access to the filter unit 14 and screen unit 19 thereof which needs replacement or repair, whereupon the screen clamping or holding ring 23 is removed from the body 15 of the particular filter unit 24 by manually withdrawing the same from the annular groove 22 in the body 15 in the filter unit 14 and replacing a new screen unit 19 therein.

Any desired number of filter units 10 may be employed in connection with chemical electro-plating equipment, as is well understood in the art.

A modification of the invention is illustrated in FIGS. 8 and 9 of the drawings and those parts embodied therein which are similar to or comparable to corresponding parts of the invention illustrated in FIGS. 1 to 7, inclusive, have been given similar reference numerals followed by the additional and distinguishing reference character "a."

The form of the invention illustrated in FIGS. 8 and 9 of the drawings is substantially similar to that illustrated in FIGS. 1 to 7, inclusive, except that in this form of the invention the screen unit 19a is mounted in position of use in the body 15a of the filter unit 14a by clamping means which includes an annular clamping or retaining groove 25 which is formed in one face of the body 15a of the filter units 24a and clamping ring 27 which is frictionally fitted into the annular groove 25 and holds a marginal edge portion 26 of the outer screen member 21a therein. This assembly is fitted to and encircles the body 15a of the filter unit 14a and projects above the screen unit 19a, as shown in FIG. 9, and cooperates with the clamping member 27 in retaininge the filter screen unit 19a in position of use.

In order to remove and replace the filter screen unit 19a it is merely necessary to remove the clamping ring 27 from the clamping groove 25 and then withdraw the marginal edge portion 26 of the filter screen unit 19a from the clamping groove 25.

Another modification of the invention is illustrated in FIGS. 10 and 11 of the drawings, and those parts thereof which are similar to corresponding parts of the form of the invention illustrated in FIGS. 1 to 7, inclusive, have been given the samer eference numerals followed by the additional and distinguishing reference character "b."

The form of the invention illustrated in FIGS. 10 and 11 is substantially similar to that shown in FIGS. 1 to 7, inclusive, but differs therefrom in the means employed for clamping the fabric screen unit 19b in position of use upon the body 15b of the filter unit 14b. To this end a generally U-shaped annular clamping unit 29 is provided by means of plastic resinous rings 30, 31 and 32, which are adhesively or otherwise secured together to provide an annular clamping groove 33 formed therein, a marginal edge portion 34 of the outer flexible screen member 21b projects into this annular clamping groove 33 and is held therein by means of a clamping ring 28 which has an upper portion 35 projecting into the annular clamping groove 33 and which clamps the outer marginal edge portion 34 of the outer flexible screen member 21b in position of use therein. The clamping ring 28 is adhesively or otherwise secured to the outer marginal edge portion of the body 15b of the filter unit 14b.

In order to remove and replace the filter screen unit 19b, in the form of the invention illustrated in FIGS. 10 and 11, it is merely necessary manually to lift the clamping means 29–30–31–32 as a unit upwardly off the upper portion 35 of the ring 28, and off the body 15b of the filter unit 14b, thereby freeing the outer marginal edge portion 34 of the screen unit 19b for removal from the end portion 35 of the ring 28.

Another modification of the invention is illustrated in FIGS. 12 to 15, inclusive, wherein it is generally indicated at 41, and those parts in this form of the invention which are similar or comparable to corresponding parts in the form of the invention illustrated in FIGS. 1 to 7, inclusive, have been given similar reference numerals followed by the additional and distinguishing reference character "c."

In the form of the invention illustrated in FIGS. 11 to 14, inclusive, the outer marginal edge portion 42 of the inner fabric screen member 20c extends into and is retained in an annular groove 22c in the body 15c of each filter unit 14c by means of an annular clamping and retaining ring member 23c, and a paper or like disc filter unit 43 is disposed above the main body of the inner fabric screen member 20c.

As shown in FIGS. 12, 14 and 15, an annular series of retaining pegs or projections 44 is provided on the bottom surface of the body 15c of each of the filter elements 14c adjacent the outer peripheral surface thereof (FIG. 14) and these pegs or projections project downwardly toward the paper or like filter disc component of the filter unit 19c therebelow, for a reason which will be pointed out presently. The downwardly extending pegs or projections 44 may be formed in any suitable manner as, for example, by being molded of suitable plastic resinous material integrally with the body 15c of each filter unit 14c.

As shown in FIG. 13, in the use of the form of the filter unit shown in FIGS. 12 to 15, inclusive, filter material in the form of filter powder or cake 45 is deposited on the upper surface of the paper or like disc component 43 of the filter screen unit 19c and the annular clamping ring member 23c has an upwardly extending portion 46 which projects above the top or upper surface of the paper or like filter disc 43 a sufficient distance to provide a retaining ring member which prevents the filter powder or cake from being washed off the upper surface of the paper or like filter disc 43 in use.

Likewise, in the use of the form of the invention shown in FIGS. 11 to 14, inclusive, the depending pegs or projections 44 extend downwardly to a point closely adjacent to the upper surface of the paper or like filter disc therebelow (as, for example, ¼" therefrom) so that the electro-chemical plating solution or other liquid which is being filtered is prevented from getting under the paper or like filter disc 43 and raising it up out of its intended and proper position of use.

However, when it is desired to replace the paper filter disc 43 this may readily be accomplished by merely removing the filter unit 14c from the assembly, as described hereinbefore, and inverting it to dislodge, by gravity, the paper filter disc 43 and accumulated material thereon, whereupon a new paper filter disc 43 may be installed in place thereof.

It will thus be seen from the foregoing description, considered in conjunction with the accompanying drawings, that the present invention provides a new and improved filter apparatus, and a new and improved filter unit therefor, having the desirable advantages and characteristics and accomplishing its intended objects including those hereinbefore pointed out and others which are inherent in the invention.

I claim:
1. A fluid filtering apparatus comprising:
 (a) a housing;
 (b) a plurality of filter units arranged in stacked relationship in said housing;
 (c) means providing a central passage through said housing and cooperating with said filter units for holding said filter units in position in said housing;
 (d) each of said filter units including;
  (1) a body having
   (a) a plurality of radially extending passages therein communicating with said central passage and having
   (b) a plurality of annular passages therein communicating with said radially extending passages;
 (e) each of said filter units including
  (1) a filter screen unit attached thereto at one side of said filter body and adapted to have fluid pass therethrough into said radially extending passages and into said annular passages;
 (f) said means comprising
  (1) a plurality of stacked cylindrical sections;
 (g) each of said cylindrical sections having
  (1) a radially offset cylindrical portion integral with the lower end thereof and providing
  (2) a portion which telescopes over the upper end of the adjacent cylindrical section;
 (h) the upper end of said offset cylindrical portion providing
  (1) a support for said filter unit and its lower end providing
  (2) a clamping means for the filter unit supported therebelow;
 (i) each of said cylindrical sections having
  (1) radial openings communicating with said radially extending passages; and
 (j) means for detachably attaching the outer marginal edge portion of each screen unit to the body of the filter unit; said last-named means comprising
  (1) an annular clamping unit, inverted U-shaped in cross section, forming a downwardly opening clamping groove; and
  (2) a clamping ring which has its lower portion secured to the marginal edge portion of the body of the filter unit and its upper edge clamping said screen unit in said clamping groove.

2. A fluid filtering apparatus comprising:
 (a) a housing;
 (b) a plurality of filter units arranged in stacked relationship in said housing;
 (c) means providing a central passage through said housing and cooperating with said filter units for holding said filter units in position in said housing;
 (d) each of said filter units including
  (1) a body having
   (a) a plurality of radially extending passages therein communicating with said central passage and having
   (b) a plurality of annular passages therein communicating with said radially extending passages;
 (e) each of said filter units including
  (1) a filter screen unit attached thereto at one side of said filter body and adapted to have fluid pass therethrough into said radially extending passages and into said annular passages
 (f) said means comprising
  (1) a plurality of stacked cylindrical sections;
 (g) each of said cylindrical sections having
  (1) a radially offset cylindrical portion integral with the lower end thereof and providing a portion which telescopes over the upper end of the adjacent cylindrical section;
 (h) the upper end of said offset cylindrical portion providing a support for said filter screen unit and its lower end providing
  (1) a clamping means for the filter unit supported therebelow;
 (i) each of said cylindrical sections having
  (1) radial openings communicating with said radially extending passages; and
 (j) means for detachably attaching an outer marginal edge portion of each of said filter screen units to the body of the filter unit; said last-named means comprising
  (1) an annular clamping groove formed in the body of each of said filter units;
  (2) an annular clamping member removably mounted in said annular clamping groove and detachably retaining the said outer marginal edge portion of the said filter screen unit in the said annular clamping groove; and
 (k) each of said annular clamping members including an annular outer wall portion surrounding and projecting above the upper surface of the said filter screen unit therebelow to prevent filter material from being washed from the upper surface of the said filter screen unit in use.

3. A fluid filtering apparatus as defined in claim 2 in which the said filter screen unit embodies
 (a) a paper filter disc member; and in which
 (b) the said annular clamping member includes an annular outer wall portion surrounding and projecting above the upper surface of the said paper filter disc member to prevent filter material accumulating on the upper surface of the said paper filter disc member from being washed therefrom in use.

4. A fluid filtering apparatus as defined in claim 3 in which:
 (a) the body of each of said filter units includes
  (1) a bottom surface having
   (a) a plurality of spaced downwardly extending members therein which project downwardly toward and into close proximity with the upper surface of the said paper disc member to prevent the fluid being filtered from entering under the said paper filter disc member and dislodging the said filter disc member from position of use.

References Cited

UNITED STATES PATENTS

| | | | |
|---|---|---|---|
| 608,655 | 8/1898 | Douglas | 210—344 |
| 2,687,217 | 8/1954 | Kracklauer | 210—344 |
| 3,141,845 | 7/1964 | Nadherny | 210—344 X |
| 3,142,642 | 7/1964 | Kracklauer | 210—344 X |

REUBEN FRIEDMAN, *Primary Examiner.*

F. A. SPEAR, *Assistant Examiner.*